US012442216B2

(12) United States Patent
Ho

(10) Patent No.: US 12,442,216 B2
(45) Date of Patent: Oct. 14, 2025

(54) DUAL LOCK ASSEMBLY STRUCTURE

(71) Applicant: REAL LOCKS & SECURITY CO., LTD., New Taipei (TW)

(72) Inventor: Hsi-Hao Ho, New Taipei (TW)

(73) Assignee: REAL LOCKS & SECURITY CO., LTD., New Taipei (TW)

( * ) Notice: Subject to any disclaimer, the term of this patent is extended or adjusted under 35 U.S.C. 154(b) by 86 days.

(21) Appl. No.: 18/537,763

(22) Filed: Dec. 12, 2023

(65) Prior Publication Data

US 2024/0218698 A1 Jul. 4, 2024

(30) Foreign Application Priority Data

Dec. 29, 2022 (TW) .................................. 111150712

(51) Int. Cl.
*E05B 37/00* (2006.01)
*E05B 9/02* (2006.01)
*E05B 37/02* (2006.01)

(52) U.S. Cl.
CPC ............ *E05B 37/0031* (2013.01); *E05B 9/02* (2013.01); *E05B 37/02* (2013.01)

(58) Field of Classification Search
CPC ... E05B 9/00; E05B 9/02; E05B 37/00; E05B 37/02; E05B 37/04; E05B 37/08; E05B 37/0031; E05B 17/142; E05B 17/145
USPC ............................................................ 70/284
See application file for complete search history.

(56) References Cited

U.S. PATENT DOCUMENTS 7,213,425 B2 * 5/2007 Ling ..................... E05B 37/025 70/284
8,353,184 B2 * 1/2013 Ling ....................... E05B 39/00 70/284
8,776,556 B2 * 7/2014 Lai ........................ E05B 37/025 70/284
8,881,558 B2 * 11/2014 Misner .................. E05B 37/025 70/284
8,931,313 B2 * 1/2015 Lai ........................ E05B 37/025 70/284
2006/0266084 A1 * 11/2006 Kuo ........................ E05B 39/00 70/21
2009/0145185 A1 * 6/2009 Gartner ................... E05B 37/08 29/428
2012/0304711 A1 * 12/2012 Misner .................. E05B 35/105 70/285
2017/0114567 A1 * 4/2017 Taylor ................. E05B 37/0058
2018/0002952 A1 * 1/2018 Hollman ............... E05B 27/005

(Continued)

FOREIGN PATENT DOCUMENTS

DE 202021105159 U1 * 11/2021 ........... E05B 13/002

*Primary Examiner* — Nathan Cumar
(74) *Attorney, Agent, or Firm* — HDLS IPR SERVICES; Chun-Ming Shih

(57) ABSTRACT

A dual lock assembly structure includes a lock housing, a password mechanism, a key lock core and a closed casing. The password mechanism includes a wheel pack, a password control module and a lock core control member. The password control module includes a roller seat and a control plate for clamping the wheel pack to be installed together with the key lock core in the lock housing. A closed casing is provided for covering. Therefore, it reduces the interference effect of the lock housing or the closed housing on the password mechanism to maintain its smoothness in operation and handfeel, while facilitating the assembly of the product.

10 Claims, 8 Drawing Sheets

(56) References Cited

U.S. PATENT DOCUMENTS

| | | | | |
|---|---|---|---|---|
| 2019/0345733 | A1* | 11/2019 | Roatis | E05B 3/08 |
| 2024/0218698 | A1* | 7/2024 | Ho | E05B 9/02 |

* cited by examiner

DUAL LOCK ASSEMBLY STRUCTURE

TECHNICAL FIELD

The present disclosure relates to a lock, and more particularly relates to a dual lock assembly structure that uses a key and a password for locking and unlocking.

RELATED ART

Dual lock is a lock using a key and/or a password to achieve the effect of unlocking the lock. A related-art dual lock includes a lock core which is opened by the key, a password mechanism formed by a plurality of number wheels, and a control module linked between the lock core and the password mechanism, in which the control module often requires a complicated structural design to achieve consistent locking and unlocking actions between the lock core and the password mechanism.

In the related-art dual lock, there is often a lack of detail in the overall assembly of the lock due to the above complicated structural design, that is, the related-art lock has a housing formed by a front half and a back half, and each of the above mechanisms or components is configured in the front half or the back half, and then the front half and the back half are engaged and formed into one piece. Such design is likely to result in that the housing compresses the internal mechanisms or components, which affects the smoothness of operation of the internal mechanisms or components, and even affects the smoothness of the operation of the number wheels by the hand. At the same time, the related-art dual lock must be assembled into its housing one by one, thus causing a difficult and time-consuming assembling process, incurring a higher cost, and resulting in a lower yield and a difficult maintenance issue.

In view of the above, the present discloser based on years of experience to conduct extensive research and experiment, and finally provided a reasonable feasible design in accordance with this disclosure to improve the drawbacks of the related art.

SUMMARY OF THE DISCLOSURE

The primary objective of the present disclosure is to provide a dual lock assembly structure, which the inside mechanisms or components are assembled in advance and then installed into one housing. As a result, the internal components may be sealed only by covering another housing. The interference caused by the operation of the internal components may be reduced, the smoothness of the operation and hand feel of the components may be maintained, and the assembly of the product may be facilitated.

To achieve the aforementioned objective, the present disclosure provides a dual lock assembly structure, including: a lock housing, having a containing space, a plurality of wheel holes spaced from one another and formed on the lock housing, and a lock core hole disposed adjacent to the wheel holes; a password mechanism, including a wheel pack, a password control module and a lock core control member, the wheel pack including a spindle, a plurality of number wheels passed onto the spindle, and a plurality of wheel barrels disposed on the spindle and corresponding to the number wheels respectively for clutching, the password control module comprising a roller seat and a control plate, the wheel pack being installed on the roller seat, the control plate including a plurality of limiting parts corresponding to an abutting surface of the wheel barrels, and when the abutting surface of each wheel barrel and an opposite side of each limiting part are aligned evenly, the spindle drives each wheel barrel to move along an axial direction; a key lock core, passed into the containing space and fixed to the lock core hole to link a lock lever, and when a key is inserted into the key lock core and drives the lock lever for unlocking or locking, and a knob is sheathed on the key lock core, the knob links a lock plate and drives the lock lever for unlocking or locking; and a closed casing, covered onto an opening of the containing space; wherein, the lock core control member comprises an end part passed to the spindle of the wheel pack, and an interference part abutting against the lock plate of the key lock core, and when the spindle is situated in a state capable of driving each wheel barrel to move along the axial direction, the knob of the key lock core is turned to make the lock plate push away the interference part of the lock core control member.

DETAILED DESCRIPTION

The technical characteristics of this disclosure will become apparent with the detailed description of preferred embodiments accompanied with the illustration of related drawings as follows. It is noteworthy that the embodiments and drawings disclosed herein are to be considered illustrative rather than restrictive.

Figure 1:
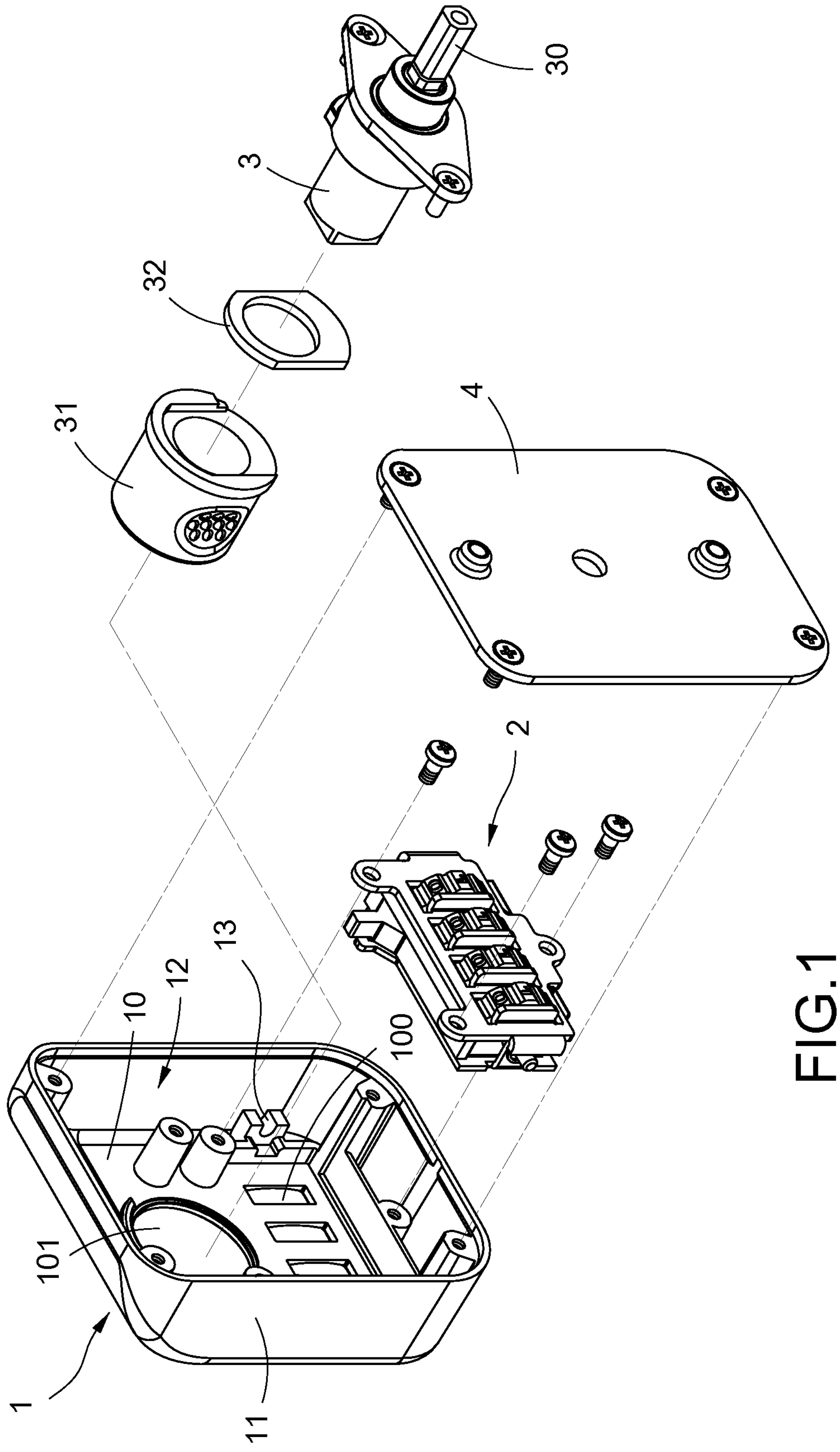
FIG. 1 is an exploded view of the present disclosure.

With reference to FIG. 1 for an exploded view of a dual lock assembly structure in accordance with the present disclosure, the dual lock assembly structure includes a lock housing 1, a password mechanism 2, a key lock core 3, and a closed casing 4.

Figure 2:
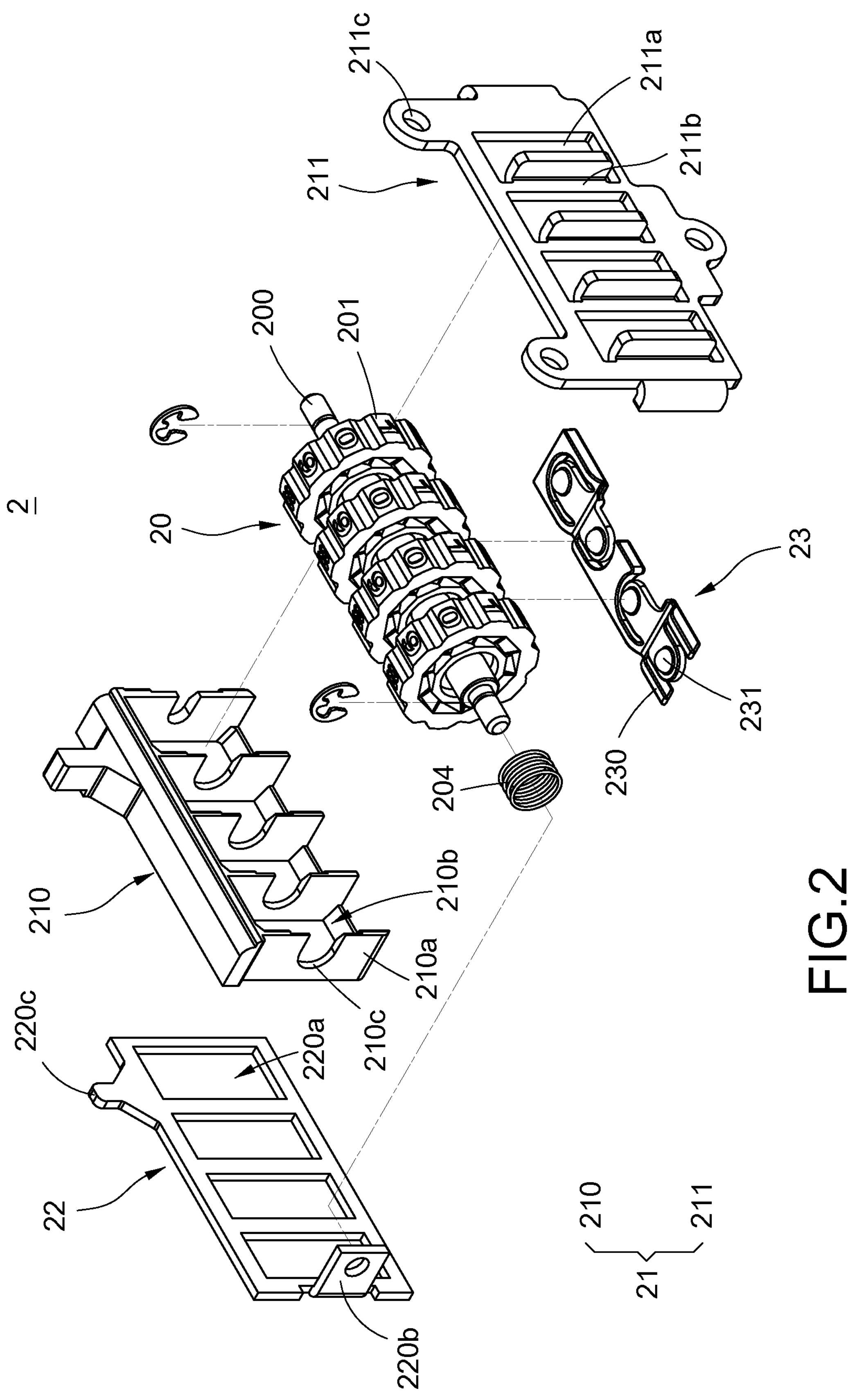
FIG. 2 is an exploded view of a password mechanism of the present disclosure.
Figure 3:
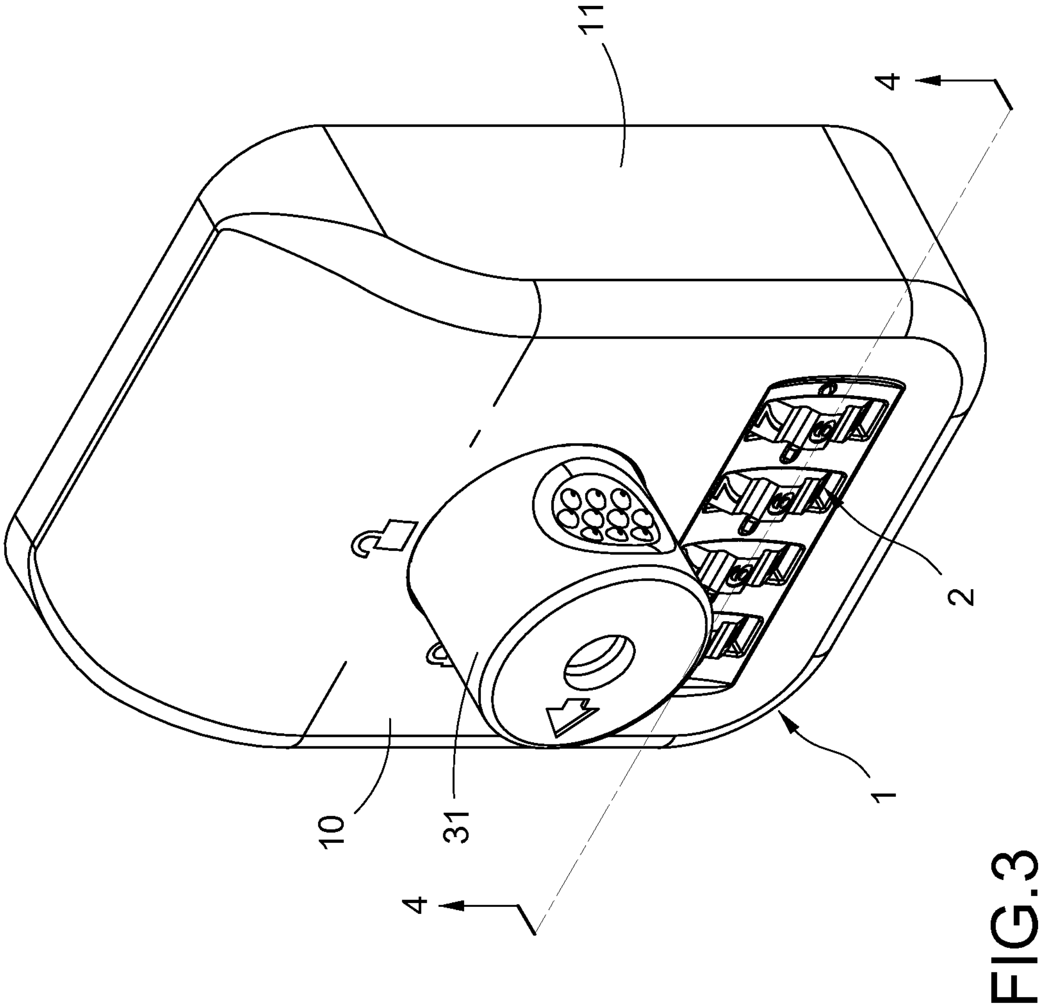
FIG. 3 is a perspective view of the present disclosure.

The lock housing 1 is provided for installing the password mechanism 2 and the key lock core 3. In a specific embodiment, after the password mechanism 2 and the key lock core 3 are assembled, they are installed in the lock housing 1 directly to obtain the aforementioned structural positioning. In FIGS. 2 and 3, the lock housing 1 has an operating surface 10, and a side part 11 surrounding the periphery of the operating surface 10, and a containing space 12 is defined by enclosing the operating surface 10 and side part 11. The containing space 12 is provided for installing the password mechanism 2 and the key lock core 3 into the lock housing 1. Further, the operating surface 10 has a plurality of wheel holes 100 spaced from one another and formed on the operating surface 10, and a lock core hole 101 disposed above the wheel holes 100, where the lock core hole 101 is provided for partially passing the key lock core 3 to the outside from the containing space 12 for fixation and facilitating the rotation of each number wheel 201 of the password mechanism 2. In the containing space 12, a hinge 13 is installed on the backside of the operating surface 10, or an inner wall of the side part 11 for pivotally installing the spindle 200 of the password mechanism 2. The quantity of wheel holes 100 is corresponding to that of the number wheel 201 of the password mechanism 2, so that each number wheel 201 is partially exposed from the containing space 12 and protrudes from each wheel hole 100 to facilitate users to dial each number wheel 201 and adjust the correct password.

Figure 4:
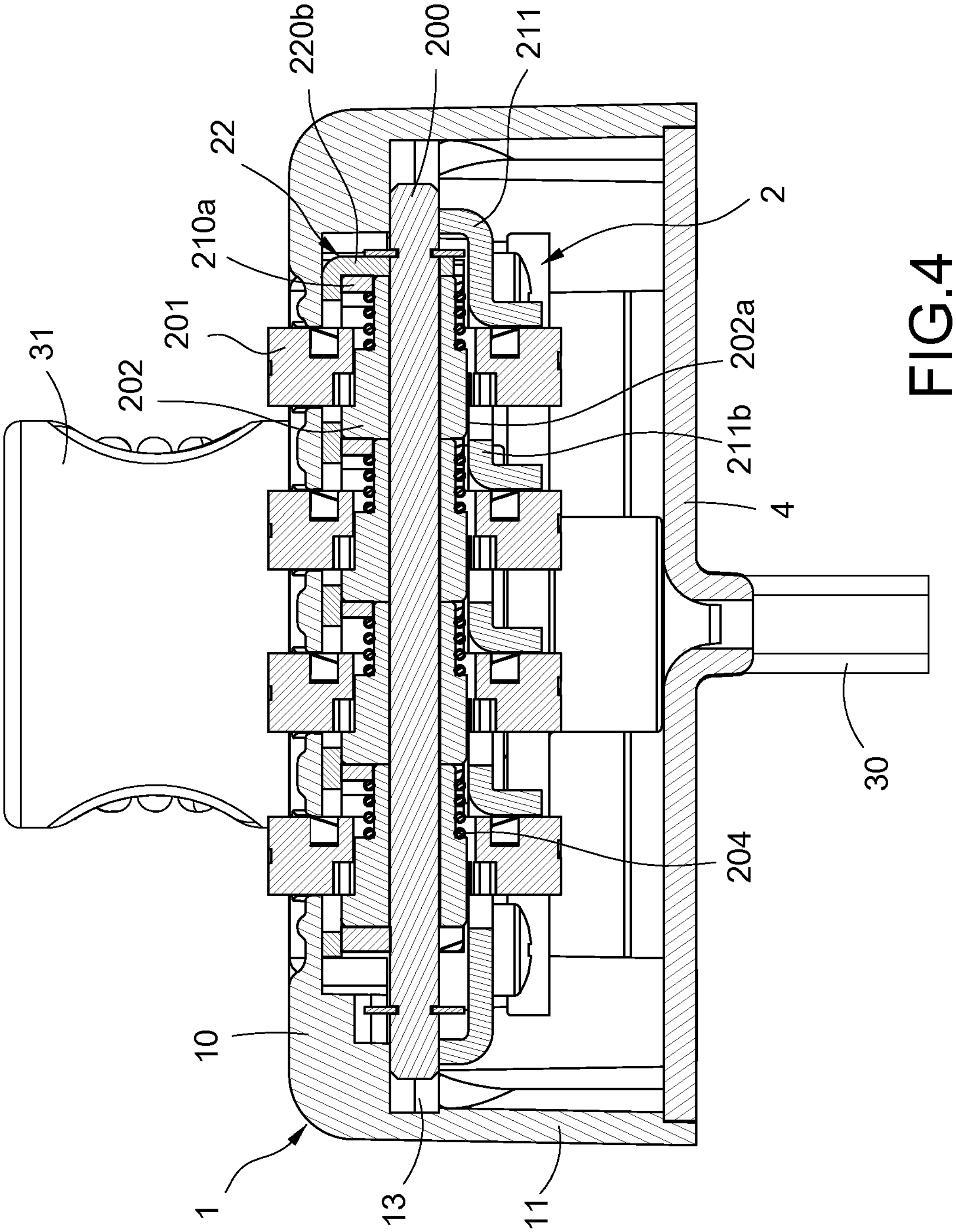
FIG. 4 is a cross-sectional view of Section 4-4 of FIG. 0.3.
Figure 6:
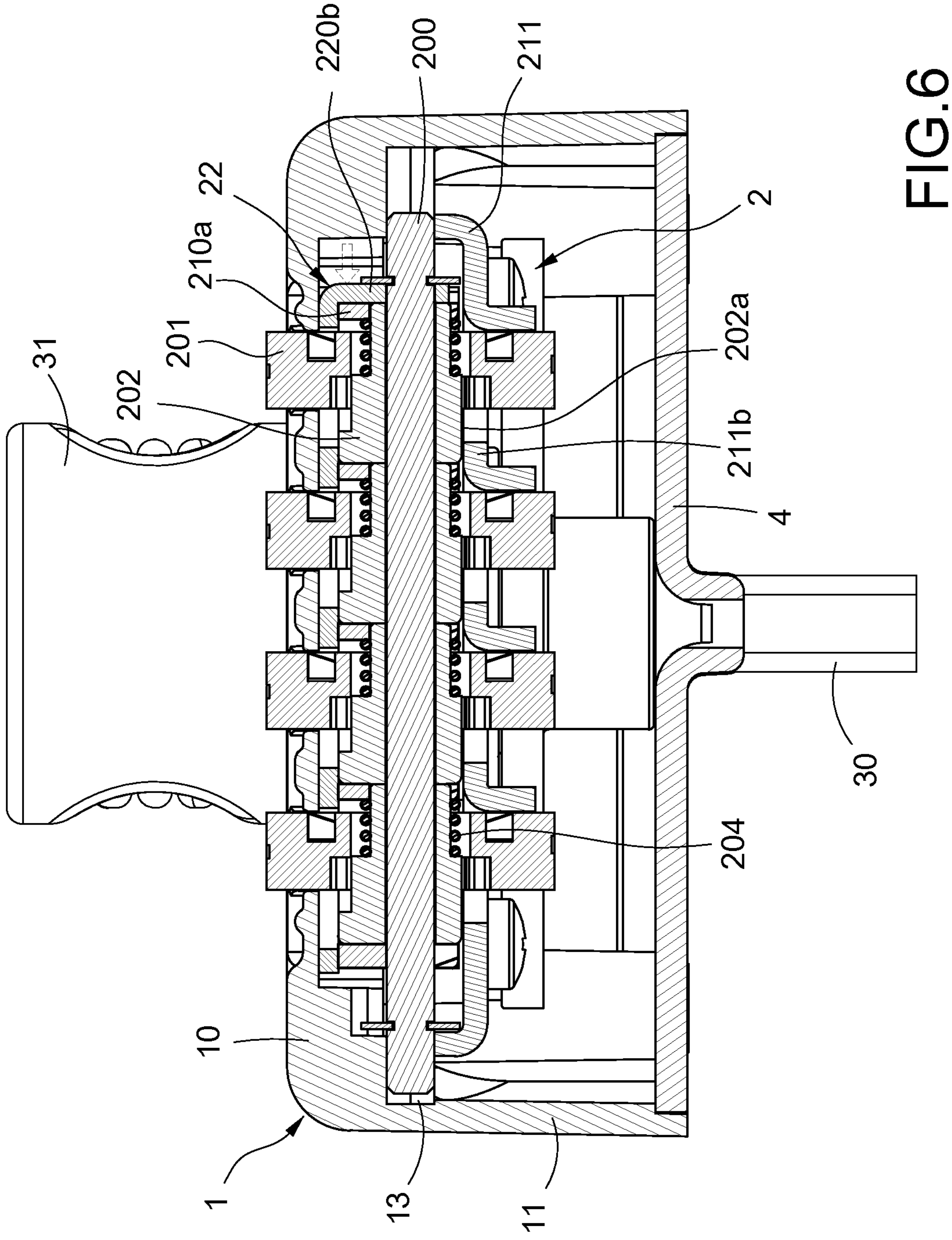
FIG. 6 is a schematic view of dialing a number wheel as depicted in FIG. 5 to a correct number and setting a spindle in a condition capable of moving in an axial direction.

In FIGS. 2, 3 and 4, the password mechanism 2 includes a wheel pack 20, a password control module 21, and a lock core control member 22. The wheel pack 20 includes the aforementioned spindle 200, a plurality of wheel barrels 202 passed onto the spindle 200 (the spindle 200 passes through the wheel barrels 202), a plurality of number wheels 201 installed to the wheel barrels 202 respectively for clutching, and an elastic element 204 installed between the wheel barrels 202 to enable the spindle 200 to drive each wheel barrel 202 to move in an axial direction (as shown in FIG. 6). After being separated from each number wheel 201, the elastic element 204 is restored to its engaged state. The password control module 21 includes a roller seat 210 and a control plate 211, the roller seat 210 includes a plurality of partitions 210*a* corresponding to a side of the operating surface 10 of each wheel barrel 202, a plurality of hollow parts 210*b* spaced from one another by the partitions 210*a* and provided for accommodating the number wheels 201 respectively, and a notch 210*c* is formed on each partition 210*a* for passing through the spindle 200. The control plate 211 includes a plurality of opening parts 211*a* corresponding to a side of each wheel barrel 202 adjacent to the closed casing 4, and a plurality of limiting parts 211*b* disposed between the opening parts 211*a*, and each wheel barrel 202 has an abutting surface 202*a*. When the abutting surface 202*a* of each wheel barrel 202 is aligned precisely with a side of each limiting part 211*b*, the spindle 200 is pushed by the lateral displacement of the lock core control member 22, so that the spindle 200 drives each wheel barrel 202 to move in an axial direction (as shown in FIG. 6).

The lock core control member 22 has a plurality of front wheel holes 220*a* corresponding to the number wheels 201 respectively, and installed at the front end of the roller seat 210 of the password control module 21. The lock core control member 22 and the control plate 211 of the password control module 21 are clamped by the front end of the roller seat 210 and the rear end of the wheel pack 20, so as to assemble the password mechanism 2 as one piece, which is installed together with the key lock core 3 into the containing space 12 of the lock housing 1, and finally the closed casing 4 covers the opening of the containing space 12 of the lock housing 1 to complete the dual lock assembly structure of the present disclosure.

Figure 5:
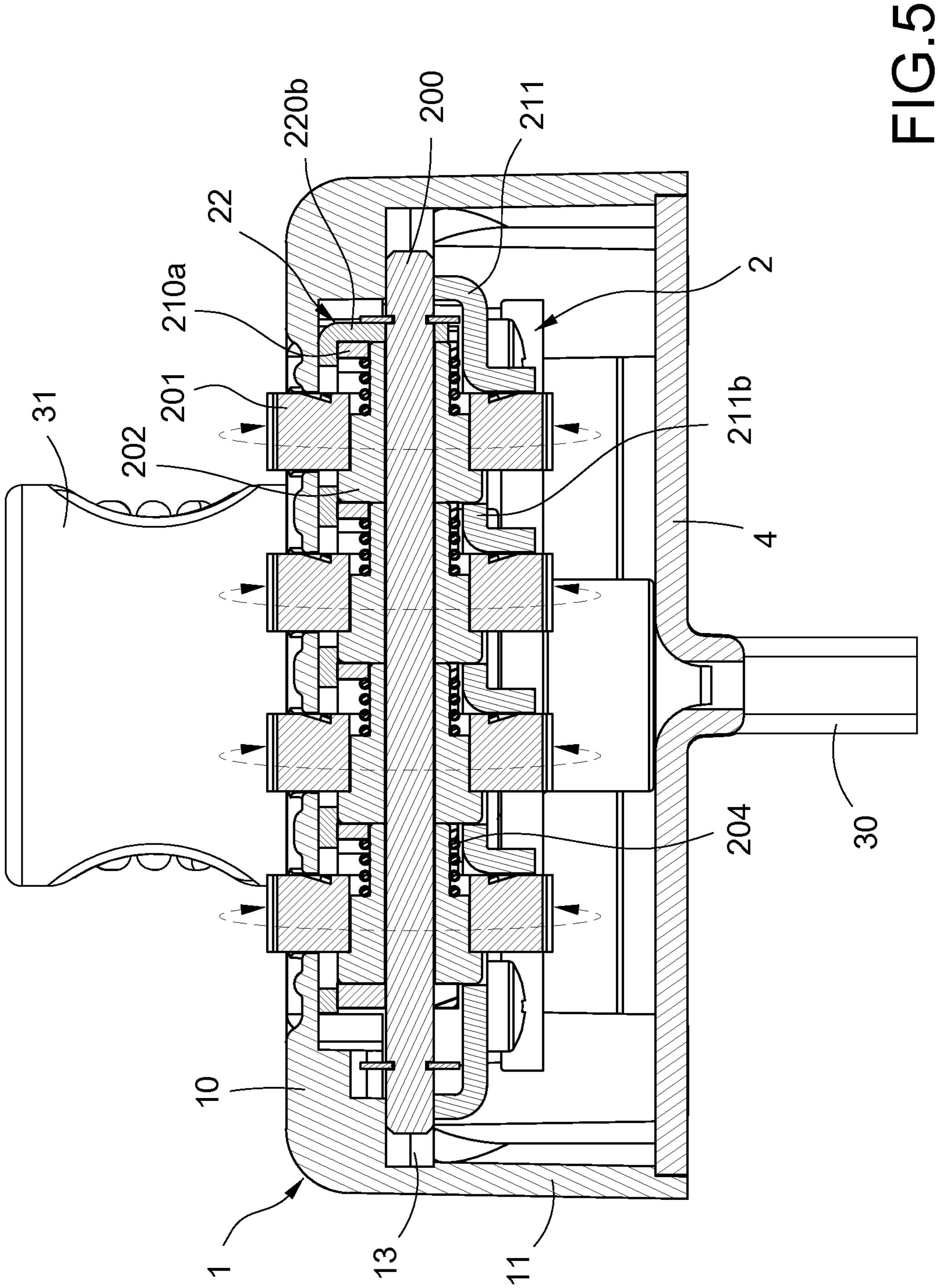
FIG. 5 is a schematic view of turning a number wheel as depicted in FIG. 4.
Figure 7:
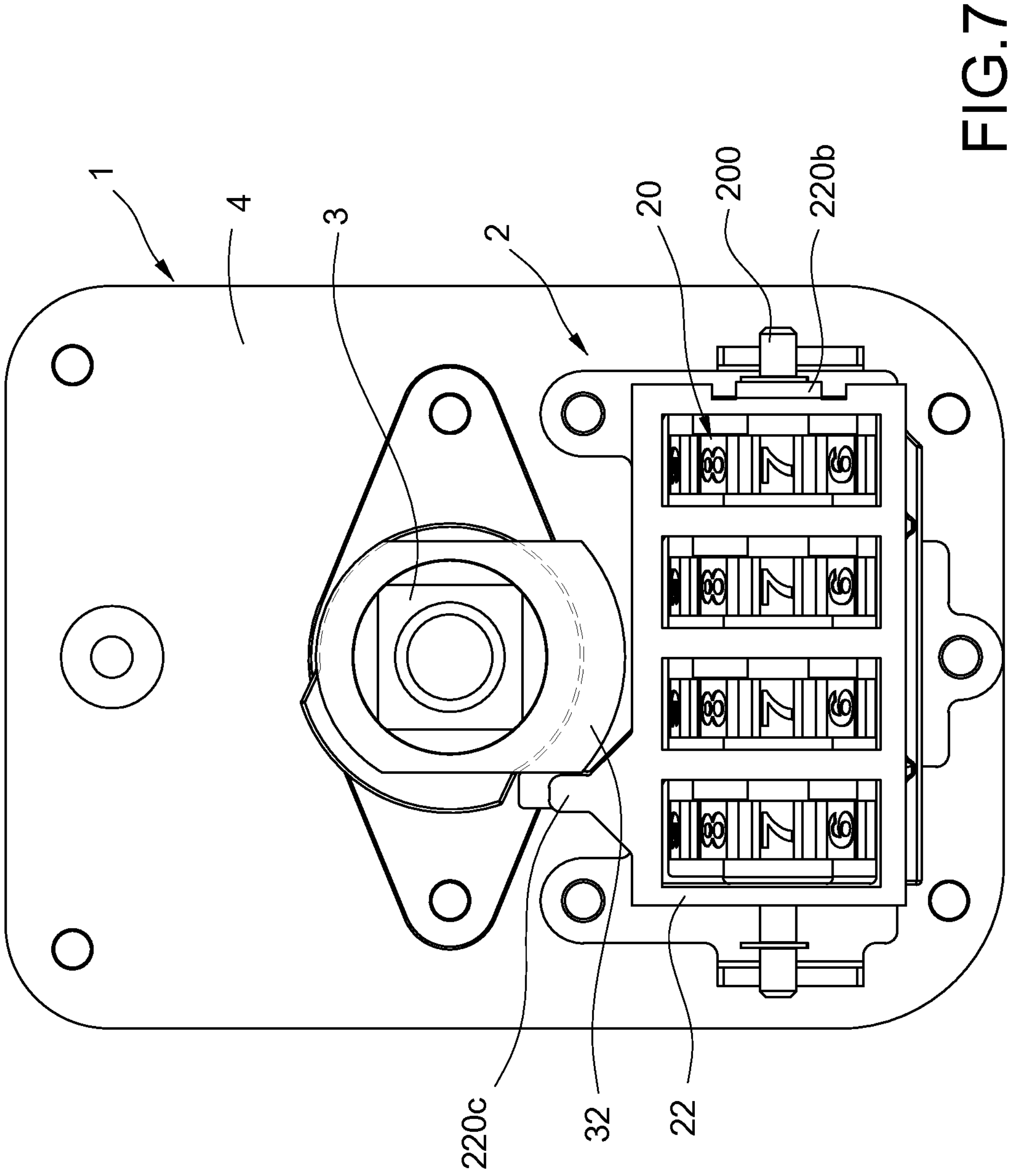
FIG. 7 is a schematic view showing the internal structure of the present disclosure before a key lock core is turned.
Figure 8:
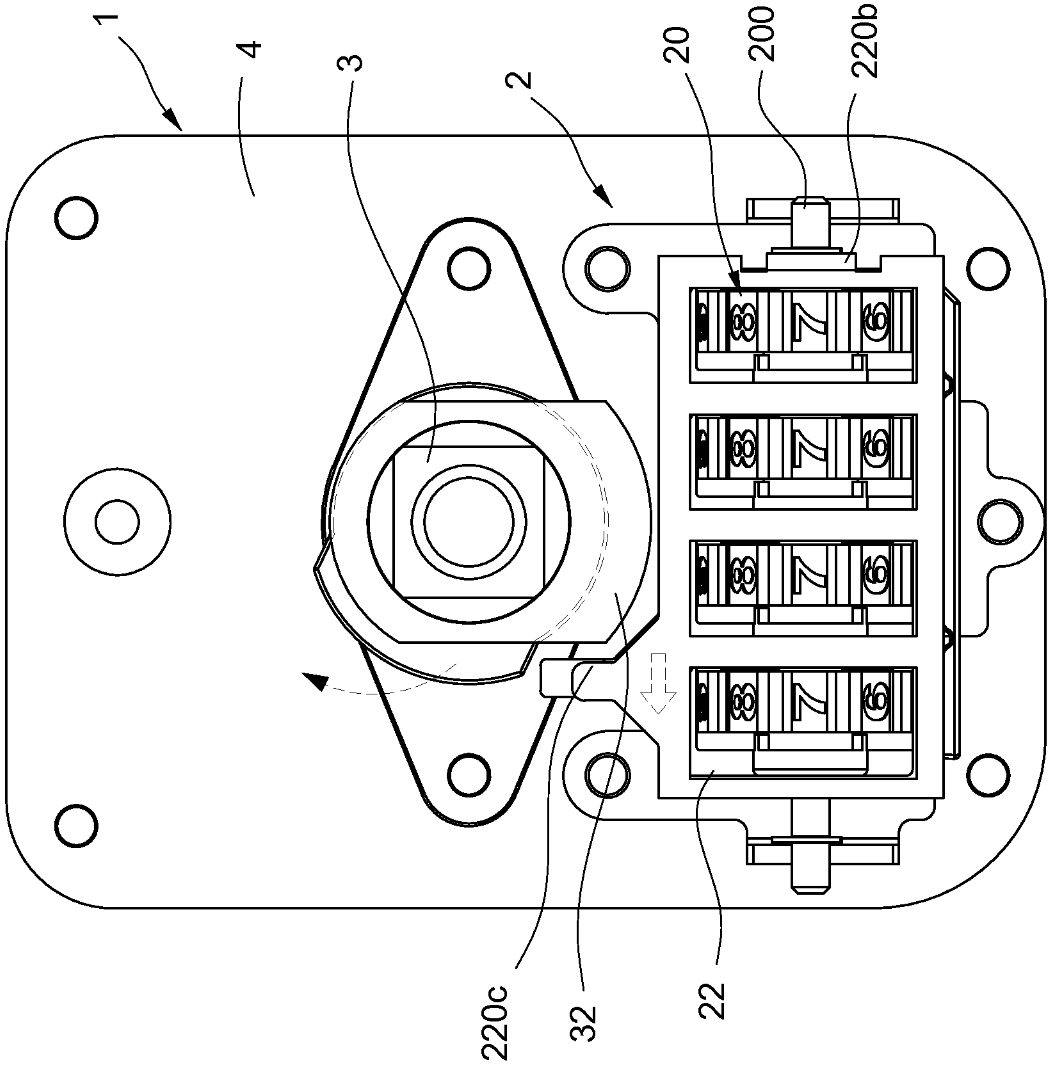
FIG. 8 is a schematic view showing the internal structure of the present disclosure after a key lock core is turned.

In FIGS. 2 and 4, the lock core control member 22 further includes an end 220*b* passed and installed to the spindle 200 of the wheel pack 20, and an interference part 220*c* abutting against the key lock core 3 (as shown in FIG. 7). In FIGS. 1 and 3, a rear end of the key lock core 3 is linked to a lock lever 30, such that after a correct key is inserted into the key lock core 3, the lock lever 30 is driven for an unlocking or locking action (not shown in the figure), and the key lock core 3 has a knob 31 linked to a lock plate 32, so that after a correct password is entered by the wheel pack 20, the turning of the knob 31 drives the lock lever 30 to control a structure such as a deadbolt for the aforementioned unlocking or locking action (not shown in the figure). In FIG. 5, each number wheel 201 is dialed to adjust the wheel pack 20 to the correct password. In FIG. 7, when the number wheel 201 of the wheel pack 20 is situated at a correct password (such as "7777"), the abutting surface 202*a* of each wheel barrel 202 is aligned precisely with a side of each limiting part 211*b*. At this time, the spindle 200 is in a state capable of driving each wheel barrel 202 to move in axial direction (as shown in FIG. 6). In FIGS. 3 and 8, the knob 31 is turned to link the lock plate 32 to rotate, so that the lock plate 32 pushes open the interference part 220*c* of the lock core control member 22 to drive the lock lever 30 for unlocking. On the contrary, when each number wheel 201 is not in the correct password, the control plate 211 of the password control module 21 uses each limiting part 211*b* to prevent each wheel barrel 202 to move along the axial direction of the spindle 200, so as to limit the rotation of the lock plate 32 by the interference part 220*c*, and keep the key lock core 3 in the locked state to prevent the lock lever 30 to carry out the unlocking action.

When a user forgets the password, the user may insert a correct key into the lock core 3 to turn the knob 31 directly to abut the lock plate 32 against the end 220*b*, so as to drive the lock core control member 22 to make the spindle 200 move in the aforementioned axial direction and each wheel barrel 202 compresses the corresponding elastic element 204. At this time, the number wheels 201 are dialed one by one. Until the wheel barrel 202 of each corresponding number wheel 201 is dialed to a position where the abutting surface 202*a* is aligned precisely with a side of each limiting part 211*b*, the wheel barrel 202 is bounced back by the compressed elastic element 204. After the wheel barrels 202*a* are bounced back one by one, the corresponding number of each number wheel 201 constitutes the correct password. Of course, the correct password is retrievable or the password is resettable to a new password by inserting the aforementioned correct key into the lock core 3. In FIG. 2, an elastic component 23 is added and installed under the wheel pack 20 in order to generate a positioning handfeel when dialing the number wheels 201. The elastic component 23 includes a base 230, and a plurality of elastic protrusions 231 disposed on the base 230 corresponding to the number wheels 201 respectively. Each elastic protrusion 231 is disposed under each number wheel 201, so that when the number wheel 201 is dialed to touch the elastic protrusion 231 to generate a bouncing handfeel, while providing the positioning effect of each number wheel 201. In addition, the elastic component 23 is further installed under the roller seat 210 corresponding to each hollow part 210*b*. In addition, the control member 211 further includes a plurality of threaded lugs 211*c* disposed protrusively from the periphery of the control member 211, and provided to facilitate fixing the password mechanism 2 and the key lock core 3 into the containing space 12 of the lock housing 1 by a locking element such as a screw, etc.

With the above structural assembly, the dual lock assembly structure of the present disclosure is achieved.

Therefore, the present disclosure assembles and modularizes the password mechanism 2, and installs it together with other mechanisms or components (such as the key lock core 3) inside the dual lock into the lock housing 1, so that the closed casing 4 only needs to be covered onto the lock housing 1 in order to complete the assembly and achieve the effects of reducing the interference effect of the lock housing or the closed housing on the password mechanism to maintain its smoothness in operation and handfeel, while facilitating the assembly of the product. The present disclosure is conducive to the improvement of existing issues of the time-consuming, high-cost, low-yield and uneasy-maintenance lock structure.

While the disclosure is described in some detail hereinbelow with reference to certain illustrated embodiments and accompanying drawings, it is to be understood that there is no intent to limit it to those embodiments. On the contrary, the aim is to cover all modifications, alternatives and equivalents falling within the spirit and scope of the invention as defined by the appended claims.

What is claimed is:

1. A dual lock assembly structure, comprising:

a lock housing, comprising a containing space, a plurality of wheel holes spaced from one another and defined thereon, and a lock core hole defined adjacent to the wheel holes;

a password mechanism, comprising a wheel pack, a password control module and a lock core control member, the wheel pack comprising a spindle, a plurality of number wheels disposed on the spindle, and a plurality of wheel barrels disposed on the spindle corresponding to the number wheels for clutching, each of the wheel barrels comprising an abutting surface, the password control module comprising a roller seat and a control plate, the wheel pack installed on the roller seat, the control plate comprising a plurality of limiting parts located corresponding to the abutting surface of each wheel barrel, and when the abutting surface of each wheel barrel and a side of each limiting part are aligned, the spindle drives each wheel barrel to move along an axial direction;

a key lock core, fixed to the lock core hole from the containing space and linked with a lock lever, and when a key is inserted into the key lock core and drives the lock lever for unlocking or locking, and a knob sheathing the key lock core links a lock plate and drives the lock lever for unlocking or locking; and a closed casing, covering an opening of the containing space;

wherein, the lock core control member comprises an end part sheathing the spindle and an interference part abutting against the lock plate of the key lock core, and when the spindle is in a state of driving each wheel barrel to move along the axial direction, the knob of the key lock core is turned to make the lock plate push away the interference part of the lock core control member.

2. The dual lock assembly structure according to claim 1, wherein the lock housing comprises an operating surface and a side part surrounding a periphery of the operating surface, and the containing space is defined by the operating surface and the side part.

3. The dual lock assembly structure according to claim 2, wherein the wheel holes and the lock core hole are defined on the operating surface.

4. The dual lock assembly structure according to claim 2, wherein the containing space comprises a hinge disposed on a backside of the operating surface or an inner wall of the side part for the spindle to be pivotally installed.

5. The dual lock assembly structure according to claim 1, wherein the roller seat comprises a plurality of partitions disposed corresponding to a side of the wheel barrels adjacent to the operating surface and a plurality of hollow parts separated by the partitions for the number wheels to be accommodated, and a notch is defined on each partition for the spindle to pass through.

6. The dual lock assembly structure according to claim 1, wherein the control plate comprises a plurality of opening parts defined corresponding to a side of the wheel barrels adjacent to the closed casing, each limiting part is disposed between two of the opening parts.

7. The dual lock assembly structure according to claim 6, wherein the lock core control member comprises a plurality of front wheel holes defined corresponding to the number wheels, and the lock core control member is assembled to a front end of the roller seat of the password control module.

8. The dual lock assembly structure according to claim 1, wherein the control member comprises a plurality of threaded lugs disposed protrusively from a periphery thereof.

9. The dual lock assembly structure according to claim 1, wherein the wheel pack comprises an elastic component disposed thereunder, and the elastic component comprises a base and a plurality of elastic protrusions disposed on the base corresponding to the number wheels.

10. The dual lock assembly structure according to claim 9, wherein the elastic component is installed under the roller seat.

* * * * *